United States Patent
Eronen et al.

(10) Patent No.: US 10,878,618 B2
(45) Date of Patent: Dec. 29, 2020

(54) FIRST-PERSON PERSPECTIVE-MEDIATED REALITY

(71) Applicant: Nokia Technologies Oy, Espoo (FI)

(72) Inventors: Antti Johannes Eronen, Tampere (FI); Jussi Artturi Leppänen, Tampere (FI); Arto Lehtiniemi, Lempaala (FI); Sujeet Shyamsundar Mate, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/674,372

(22) Filed: Nov. 5, 2019

(65) Prior Publication Data
US 2020/0160589 A1 May 21, 2020

(30) Foreign Application Priority Data
Nov. 14, 2018 (EP) .................................. 18206207

(51) Int. Cl.
 *G06T 15/20* (2011.01)
 *G06F 3/01* (2006.01)
(52) U.S. Cl.
 CPC .............. *G06T 15/20* (2013.01); *G06F 3/013* (2013.01)
(58) Field of Classification Search
 CPC ................................. G06T 15/20; G06F 3/013
 See application file for complete search history.

(56) References Cited

U.S. PATENT DOCUMENTS

| 10,261,749 B1* | 4/2019 | Wilcox | G06F 3/165 |
| 2014/0002351 A1* | 1/2014 | Nakayama | H04N 21/44218 345/156 |

(Continued)

FOREIGN PATENT DOCUMENTS

| EP | 3106963 A1 | 12/2016 |
| WO | 2017/133933 A1 | 8/2017 |

OTHER PUBLICATIONS

Extended European Search Report received for corresponding European Patent Application No. 18206207.5, dated Jun. 11, 2019, 11 pages.

*Primary Examiner* — Abderrahim Merouan
(74) *Attorney, Agent, or Firm* — Alston & Bird LLP

(57) ABSTRACT

An apparatus method comprising means for:
determining an available real space comprising a portion of a real space that comprises locations available to a user to control a corresponding virtual location of a virtual user, via first-person perspective-mediated reality, wherein first-person perspective-mediated reality creates a correspondence between a location and orientation of a user in real space to a virtual location and virtual orientation of a virtual user;
determining a constrained virtual space comprising a portion of a virtual space that corresponds to the available real space;
determining available mediated reality content which comprises multiple representations of the virtual space when observed from multiple virtual locations within the constrained virtual space;
automatically determining a sub-set of the available mediated reality content without requiring the user to change location in the real space; and (Continued)

causing rendering of at least some of the determined sub-set of the available virtual reality content to the user.

20 Claims, 11 Drawing Sheets

(56) References Cited

U.S. PATENT DOCUMENTS

| | | | |
|---|---|---|---|
| 2014/0002444 A1 | 1/2014 | Bennett et al. | |
| 2014/0028714 A1* | 1/2014 | Keating | G06K 9/00671 |
| | | | 345/633 |
| 2014/0129976 A1* | 5/2014 | Beaurepaire | G01C 21/367 |
| | | | 715/788 |
| 2014/0192087 A1* | 7/2014 | Frost | G06F 3/0325 |
| | | | 345/633 |
| 2015/0269783 A1* | 9/2015 | Yun | G06F 3/0304 |
| | | | 345/633 |
| 2016/0212538 A1* | 7/2016 | Fullam | H04R 29/001 |
| 2017/0074675 A1* | 3/2017 | Waldman | G01C 21/3682 |
| 2018/0095542 A1* | 4/2018 | Mallinson | G06F 3/017 |
| 2018/0143694 A1 | 5/2018 | Leppänen et al. | |
| 2018/0300040 A1* | 10/2018 | Mate | G06F 3/04847 |
| 2019/0187954 A1* | 6/2019 | Cricri | G06F 3/011 |

* cited by examiner

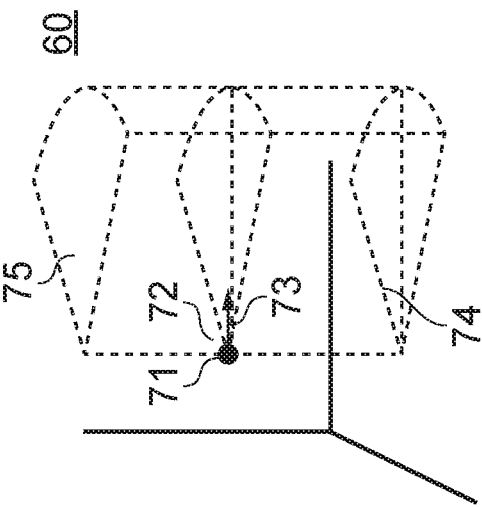
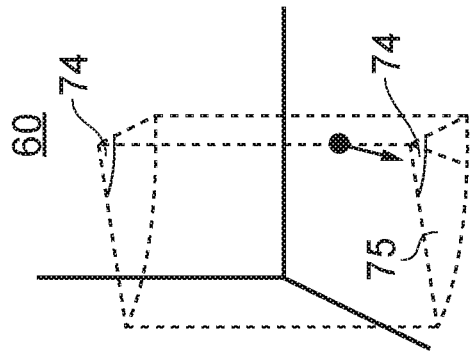
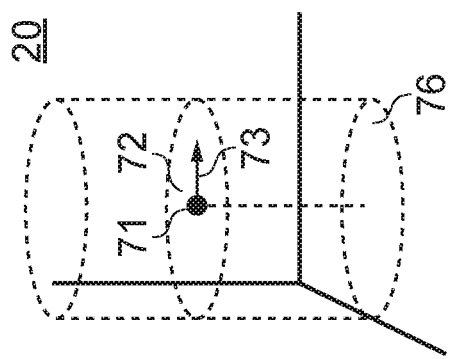
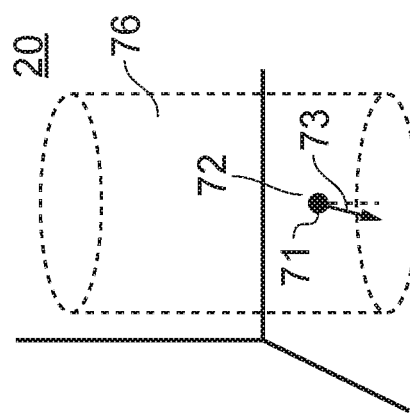
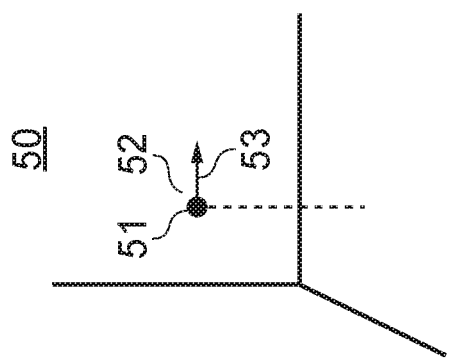
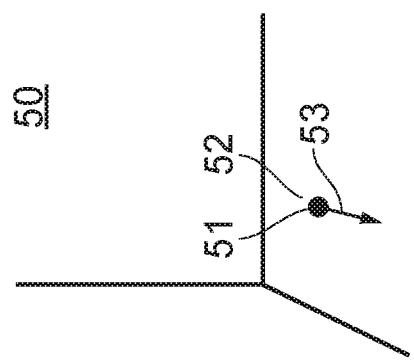
FIG. 3A
FIG. 3B
FIG. 2A
FIG. 2B
FIG. 1A
FIG. 1B

FIRST-PERSON PERSPECTIVE-MEDIATED REALITY

TECHNOLOGICAL FIELD

Embodiments of the present disclosure relate to first-person perspective-mediated reality.

BACKGROUND

In first-person perspective-mediated reality a user's real point of view (location and orientation) determines the point of view (location and orientation) within a virtual space of a virtual user. The point of view of the virtual user determines a representation of a virtual space rendered to the user.

BRIEF SUMMARY

According to various, but not necessarily all, embodiments there is provided an apparatus comprising means for: determining an available real space comprising a portion of a real space that comprises locations available to a user to control a corresponding virtual location of a virtual user, via first-person perspective-mediated reality, wherein first-person perspective-mediated reality creates a correspondence between a location and orientation of a user in real space to a virtual location and virtual orientation of a virtual user; determining a constrained virtual space comprising a portion of a virtual space that corresponds to the available real space;
determining available mediated reality content which comprises multiple representations of the virtual space when observed from multiple virtual locations within the constrained virtual space;
automatically determining a sub-set of the available mediated reality content without requiring the user to change location in the real space; and
causing rendering of at least some of the determined sub-set of the available virtual reality content to the user.

In some but not necessarily all examples, the apparatus comprises means for determining a boundary of the available real space and determining a boundary of the constrained virtual space that corresponds to the available real space.

In some but not necessarily all examples, the apparatus comprises means for determining a shape of a boundary of the available real space and determining a shape of a boundary of the constrained virtual space that corresponds to the available real space and means for determining a location of the boundary of the constrained virtual space within the virtual space.

In some but not necessarily all examples, the apparatus comprises means for determining the location of the boundary of the constrained virtual space within the virtual space and/or the scale factor for a mapping from the available real space to the constrained virtual space.

In some but not necessarily all examples, the apparatus comprises means for providing a map to the user than illustrates a boundary of the constrained virtual space within the virtual space and provides an option for the user to re-locate the constrained virtual space within the virtual space and/or change a scale, but not a shape, of the constrained virtual space within the virtual space.

In some but not necessarily all examples, the determined sub-set of available mediated reality content is limited to what can be seen by the user moving, without interacting, within the determined available real space or the determined sub-set of available mediated reality content is limited to what can be seen by the user moving, with interacting, within the determined available real space.

In some but not necessarily all examples, the multiple representations of the virtual space include virtual visual scenes that are representations of a virtual visual space viewed from a location within the virtual space and/or sound scenes that are representations of a virtual sound space listened to from a position within the virtual space.

In some but not necessarily all examples, automatically determining a sub-set of the available mediated reality content without requiring the user to change location in the real space, generates a content for a panning preview and wherein causing rendering of at least some of the determined sub-set of the available virtual reality content to the user, causes rendering of the panning preview without requiring the user to change location in the real space.

In some but not necessarily all examples, the sub-set of available mediated reality content comprises a sub-set of the multiple representations of the virtual space when observed from a sub-set of virtual locations within the constrained virtual space, wherein the sub-set of virtual locations are selected by the user during rendering of a preview.

In some but not necessarily all examples, the apparatus comprises means for selecting the sub-set of virtual locations based on a gaze direction and gaze duration during a preview.

According to various, but not necessarily all, embodiments there is provided a method comprising:
determining an available real space comprising a portion of a real space that comprises locations available to a user to control a corresponding virtual location of a virtual user, via first-person perspective-mediated reality, wherein first-person perspective-mediated reality creates a correspondence between a location and orientation of a user in real space to a virtual location and virtual orientation of a virtual user; determining a constrained virtual space comprising a portion of a virtual space that corresponds to the available real space;
determining available mediated reality content which comprises multiple representations of the virtual space when observed from multiple virtual locations within the constrained virtual space;
automatically determining a sub-set of the available mediated reality content without requiring the user to change location in the real space; and
causing rendering of at least some of the determined sub-set of the available virtual reality content to the user.

In some but not necessarily all examples, the method occurs in response to switching to first-person perspective-mediated reality from third person perspective-mediated reality.

According to various, but not necessarily all, embodiments there is provided a computer program comprising program instructions for causing an apparatus to perform at least the following:
determining an available real space comprising a portion of a real space that comprises locations available to a user to control a corresponding virtual location of a virtual user, via first-person perspective-mediated reality, wherein first-person perspective-mediated reality creates a correspondence between a location and orientation of a user in real space to a virtual location and virtual orientation of a virtual user; determining a constrained virtual space comprising a portion of a virtual space that corresponds to the available real space;

determining available mediated reality content which comprises multiple representations of the virtual space when observed from multiple virtual locations within the constrained virtual space;
automatically determining a sub-set of the available mediated reality content without requiring the user to change location in the real space; and
causing rendering of at least some of the determined sub-set of the available virtual reality content to the user.

In some but not necessarily all examples, the computer program comprises program instructions for causing an apparatus to perform at least the methods.

According to various, but not necessarily all, embodiments there is provided a system comprising:
a head mounted display apparatus, comprising a display that is not a see-through display, and configured to enable tracking of an orientation of a user wearing the head mounted display apparatus; and
an apparatus comprising means for:
determining an available real space comprising a portion of a real space that comprises locations available to a user to control a corresponding virtual location of a virtual user, via first-person perspective-mediated reality, wherein first-person perspective-mediated reality creates a correspondence between a location and orientation of a user in real space to a virtual location and virtual orientation of a virtual user;
determining a constrained virtual space comprising a portion of a virtual space that corresponds to the available real space;
determining available mediated reality content which comprises multiple representations of the virtual space when observed from multiple virtual locations within the constrained virtual space;
automatically determining a sub-set of the available mediated reality content without requiring the user to change location in the real space; and
causing rendering, at the head mounted display apparatus, of at least some of the determined sub-set of the available virtual reality content to the user.

According to various, but not necessarily all, embodiments there is provided examples as claimed in the appended claims.

BRIEF DESCRIPTION

Some example embodiments will now be described with reference to the accompanying drawings in which:

FIGS. 1A, 1B, 2A, 2B, 3A, 3B show an example embodiment of the subject matter described herein;

DEFINITIONS

Figure 4A:
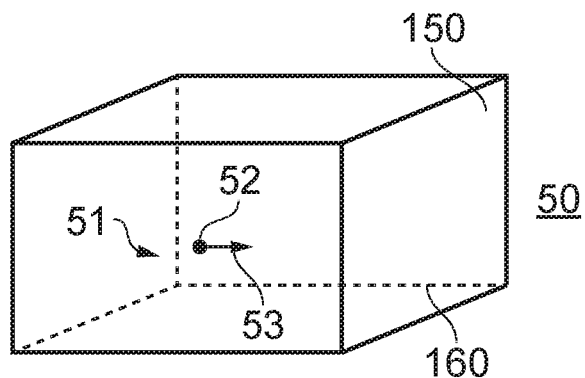
FIGS. 4A and 4B show example real spaces according to an example embodiment of the subject matter described herein.

"artificial environment" may be something that has been recorded or generated.

"virtual visual space" refers to a fully or partially artificial environment that may be viewed, which may be three dimensional.

"virtual visual scene" refers to a representation of the virtual visual space viewed from a particularpoint of view (position) within the virtual visual space.

"virtual visual object" is a visible virtual object within a virtual visual scene.

"sound space" (or "virtual sound space") refers to an arrangement of sound sources in a three-dimensional space. A sound space may be defined in relation to recording sounds (a recorded sound space) and in relation to rendering sounds (a rendered sound space).

"sound scene" (or "virtual sound scene") refers to a representation of the sound space listened to from a particular point of view (position) within the sound space.

"sound object" refers to sound source that may be located within the sound space. A source sound object represents a sound source within the sound space, in contrast to a sound source associated with an object in the virtual visual space. A recorded sound object represents sounds recorded at a particular microphone or location. A rendered sound object represents sounds rendered from a particular location.

"virtual space" may mean a virtual visual space, mean a sound space or mean a combination of a virtual visual space and corresponding sound space. In some examples, the virtual space may extend horizontally up to 3600 and may extend vertically up to 1800.

"virtual scene" may mean a virtual visual scene, mean a sound scene or mean a combination of a virtual visual scene and corresponding sound scene.

'virtual object' is an object within a virtual scene, it may be an artificial virtual object (e.g. a computer-generated virtual object) or it may be an image of a real object in a real space that is live or recorded. It may be a sound object and/or a virtual visual object.

"Virtual position" is a position within a virtual space. It may be defined using a virtual location and/or a virtual orientation. It may be considered to be a movable 'point of view'.

"Correspondence" or "corresponding" when used in relation to a sound space and a virtual visual space means that the sound space and virtual visual space are time and space aligned, that is they are the same space at the same time.

"Correspondence" or "corresponding" when used in relation to a sound scene and a virtual visual scene (or visual scene) means that the sound space and virtual visual space (or visual scene) are corresponding and a notional (virtual) listener whose point of view defines the sound scene and a notional (virtual) viewer whose point of view defines the virtual visual scene (or visual scene) are at the same location and orientation, that is they have the same point of view (same virtual position).

"real space" (or "physical space") refers to a real environment, which may be three dimensional.

"real scene" refers to a representation of the real space from a particular point of view (position) within the real space.

"real visual scene" refers to a visual representation of the real space viewed from a particular real point of view (position) within the real space.

"mediated reality" in this document refers to a user experiencing, for example visually, a fully or partially artificial environment (a virtual space) as a virtual scene at least partially rendered by an apparatus to a user. The virtual scene is determined by a point of view (virtual position) within the virtual space. Displaying the virtual scene means providing a virtual visual scene in a form that can be perceived by the user.

"augmented reality" in this document refers to a form of mediated reality in which a user experiences a partially artificial environment (a virtual space) as a virtual scene comprising a real scene, for example a real visual scene, of a physical real environment (real space) supplemented by one or more visual or audio elements rendered by an apparatus to a user. The term augmented reality implies a mixed reality or hybrid reality and does not necessarily imply the degree of virtuality (vs reality) or the degree of mediality;

"virtual reality" in this document refers to a form of mediated reality in which a user experiences a fully artificial environment (a virtual visual space) as a virtual scene displayed by an apparatus to a user;

"virtual content" is content, additional to real content from a real scene, if any, that enables mediated reality by, for example, providing one or more artificial virtual objects.

"mediated reality content" is virtual content which enables a user to experience, for example visually, a fully or partially artificial environment (a virtual space) as a virtual scene. Mediated reality content could include interactive content such as a video game or non-interactive content such as motion video.

"augmented reality content" is a form of mediated reality content which enables a user to experience, for example visually, a partially artificial environment (a virtual space) as a virtual scene. Augmented reality content could include interactive content such as a video game or non-interactive content such as motion video.

"virtual reality content" is a form of mediated reality content which enables a user to experience, for example visually, a fully artificial environment (a virtual space) as a virtual scene. Virtual reality content could include interactive content such as a video game or non-interactive content such as motion video.

"perspective-mediated" as applied to mediated reality, augmented reality or virtual reality means that user actions determine the point of view (virtual position) within the virtual space, changing the virtual scene;

"first-person perspective-mediated" as applied to mediated reality, augmented reality or virtual reality means perspective-mediated with the additional constraint that the user's real point of view (location and/or orientation) determines the point of view (virtual position) within the virtual space of a virtual user;

"third person perspective-mediated" as applied to mediated reality, augmented reality or virtual reality means perspective-mediated with the additional constraint that the user's real point of view does not determine the point of view (virtual position) within the virtual space;

"user interactive" as applied to mediated reality, augmented reality or virtual reality means that user actions at least partially determine what happens within the virtual space;

"displaying" means providing in a form that is perceived visually (viewed) by the user.

"rendering" means providing in a form that is perceived by the user.

"virtual user" defines the point of view (virtual position—location and/or orientation) in virtual space used to generate a perspective-mediated sound scene and/or visual scene.

A virtual user may be a notional listener and/or a notional viewer.

"notional listener" defines the point of view (virtual position—location and/or orientation) in virtual space used to generate a perspective-mediated sound scene, irrespective of whether or not a user is actually listening.

"notional viewer" defines the point of view (virtual position—location and/or orientation) in virtual space used to generate a perspective-mediated visual scene, irrespective of whether or not a user is actually viewing.

Three degrees of freedom (3DoF) describes mediated reality where the virtual position is determined by orientation only (e.g. the three degrees of three-dimensional orientation). In relation to first-person perspective-mediated reality, only the user's orientation determines the virtual position.

Six degrees of freedom (6DoF) describes mediated reality where the virtual position is determined by both orientation (e.g. the three degrees of three-dimensional orientation) and location (e.g. the three degrees of three-dimensional location). In relation to first-person perspective-mediated reality, both the user's orientation and the user's location in the real space determine the virtual position.

DETAILED DESCRIPTION

FIGS. 1A-B, 2A-2B, 3A-3B illustrate the application of a method to a situation where there is rendering of mediated reality using virtual content. In this context, mediated reality means the rendering of mediated reality for the purposes of achieving mediated reality, for example, augmented reality or virtual reality. In these examples, the mediated reality is first-person perspective-mediated reality. It may or may not be user interactive. It may be 3DoF or 6DoF.

FIGS. 1A, 2A, 3A illustrate at a first time a real space 50, a sound space 20 and a visual space 60 respectively. There is correspondence between the sound space 20 and the virtual visual space 60. As illustrated in FIG. 1A, a user 51 in the real space 50 has a position (point of view) defined by a location 52 and an orientation 53. The location is a three-dimensional location and the orientation is a three-dimensional orientation. As illustrated in FIGS. 2A, 3A a virtual user 71 in the virtual space (sound space 20 and/or virtual visual space 60) has a virtual position (virtual point of view) defined by a virtual location 72 and a virtual orientation 73. The virtual location 72 is a three-dimensional location and the virtual orientation 73 is a three-dimensional orientation.

In 3DoF first-person perspective-mediated reality, an orientation 53 of the user 51 controls a virtual orientation 73 of a virtual user 71. There is a correspondence between the orientation 53 and the virtual orientation 73 such that a change in the orientation 53 produces the same change in the virtual orientation 73. The virtual orientation 73 of the virtual user 71 in combination with a virtual field of view 74 defines a virtual visual scene 75 within the virtual visual space 60. In some examples, it may also define a virtual sound scene 76. A virtual visual scene 75 is that part of the virtual visual space 60 that is displayed to a user 51. A virtual sound scene 76 is that part of the virtual sound space 20 that is rendered to a user 51. The virtual sound space 20 and the virtual visual space 60 correspond in that a position within the virtual sound space 20 has an equivalent position within the virtual visual space 60. In 3DoF mediated reality, a change in the location 52 of the user 51 does not change the virtual position 72 or virtual orientation 73 of the virtual user 71.

In the example of 6DoF first-person perspective-mediated reality, the situation is as described for 3DoF and in addition it is possible to change the rendered virtual sound scene 76 and the displayed virtual visual scene 75 by movement of a location 52 of the user 51. For example, there may be a mapping M between the location 52 of the user 51 and the virtual location 72 of the virtual user 71. A change in the location 52 of the user 51 produces a corresponding change in the virtual location 72 of the virtual user 71. A change in the virtual location 72 of the virtual user 71 changes the rendered sound scene 76 and also changes the rendered visual scene 75.

This may be appreciated from FIGS. 1B, 2B and 3B which illustrate the consequences of a change in location 52 and orientation 53 of the user 51 on respectively the rendered sound scene 76 (FIG. 2B) and the rendered visual scene 75 (FIG. 3B).

Figure 4B:
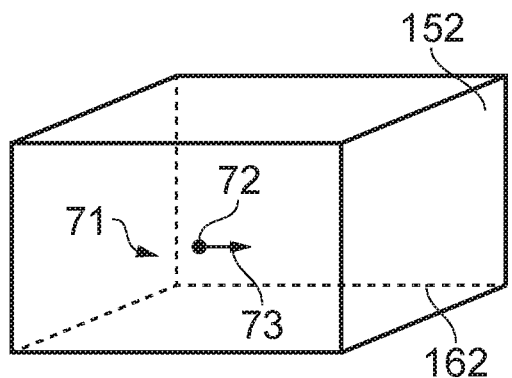

In the example illustrated in FIG. 4A, the real space 50 is constrained to an available real space 150. The available real space 150 is that part of the real space 50 that the user 51 can have a location 52 within. The user 51 cannot have a location 52 outside the available real space 150. This therefore constrains 6DoF virtual reality. As illustrated in FIG. 4B, the available real space 150 has a corresponding constrained virtual space 152. The constrained virtual space 152 is that part of the virtual space (sound space 20 and/or virtual visual space 60) that a virtual user 71 can have a virtual location 72 within.

It is possible to change the rendered virtual sound scene 76 and/or the displayed virtual visual scene 75 by movement of a location 52 of the user 51 within the available real space 150. For example, there is a mapping M between the location 52 of the user 51 in the available real space 150 and the virtual location 72 of the virtual user 71 in the constrained virtual space 152. This mapping creates a correspondence between the available real space 150 and the constrained virtual space 152. A change in the location 52 of the user 51 within the available real space 150 produces a corresponding change in the virtual location 72 of the virtual user 71 within the constrained virtual space 152. A change in the virtual location 72 of the virtual user 71 within the constrained virtual space 152 changes the rendered sound scene 76 and also changes the rendered visual scene 75. The virtual user 71 cannot have a virtual location 72 outside the constrained virtual space 152 without a change in the mapping M that creates correspondence between the real space 50 and the virtual space.

The available real space 150 comprises a boundary 160, enclosing a volume defining the available real space 150. The constrained virtual space 152 that corresponds to the available real space 150 via the mapping M comprises a boundary 162, enclosing a volume defining the constrained virtual space 152.

It is only within the available real space 150, that a location 52 and orientation 53 of the user 51 determines a real point of view (position) of the user 51 that is mapped to a virtual point of view (virtual position) of the virtual user 71 within the constrained virtual space 152. The virtual point of view of the virtual user 72 determines the rendered virtual content. The location 52 and orientation 53 are typically three-dimensional but in some examples may be two-dimensional.

The boundary 160 of the available real space 150 corresponds to the boundary 162 of the constrained virtual space 152 via the mapping M.

Figure 5A:
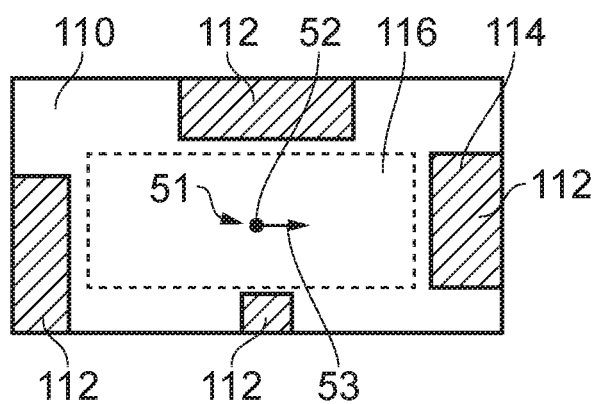
FIGS. 5A and 5B show example top-perspective views according to an example embodiment of the subject matter described herein.

FIG. 5A illustrates a top-perspective view of an example of an available real space 150. In this example the real space 50 includes a room 110 that includes furniture 112. At least some of the floor space 114 is not available to the user 51 because it is blocked by furniture 112. The available floor space 116 is the available real space 150 in two-dimensions.

Figure 5B:
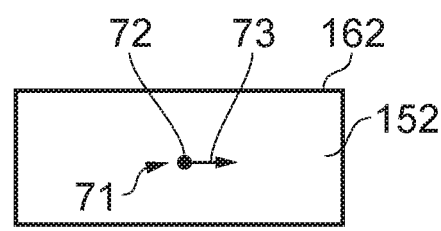

FIG. 5B illustrates a top-perspective view of an example of a constrained virtual space 152 that corresponds to the available real space 150 illustrated in FIG. 5A. In this example the virtual space extends beyond the boundary 162 of the constrained virtual space 152.

Figure 6A:
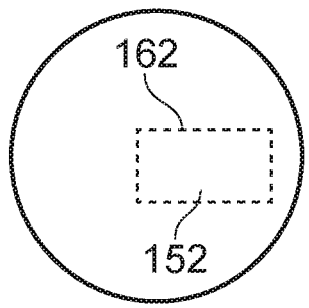
FIGS. 6A, 6B, 6C show example mappings of real spaces according to example embodiments of the subject matter described herein.
Figure 6B:
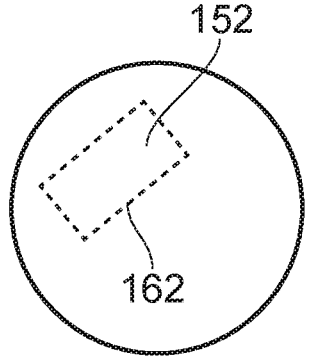
Figure 6C:
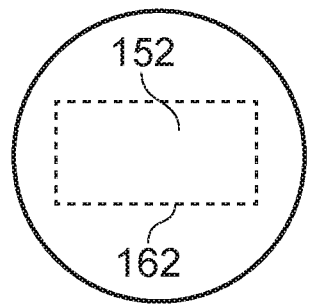

FIG. 6A, 6B and FIG. 6C illustrate that different mappings M can be used to define different correspondences between the available real space 150 and the constrained virtual space 152.

Each different mapping uses an orientation reference mapping to map an origin orientation of the user 51 to an origin virtual orientation of the virtual user 71. Changes in orientation 53 of the user 51 are measured relative to the origin orientation. Changes in virtual orientation 73 of the virtual user 71 are effected relative to the origin virtual orientation. The orientation reference mapping orients the constrained virtual space 152 corresponding to the available real space 150 within the virtual space.

Each different mapping uses an orientation mapping that maps changes in the orientation 53 of the user 51 to changes in the orientation 73 of the virtual user 71. The orientation mapping is exact and maps changes in the orientation 53 of the user 51 to the same changes in the orientation 73 of the virtual user 71. If an orientation 53 of the user 51 is defined by a polar angle ($\theta$) and an azimuthal angle ($\varphi$) (from the origin orientation) and a virtual orientation 73 of the virtual user 71 can be defined by a polar angle ($\theta'$) and an azimuthal angle ($\varphi'$) (from the virtual origin orientation), then a change in the orientation 53 of the user 51 is defined by a change in the polar angle ($\Delta\theta$) and a change in the azimuthal angle ($\Delta\varphi$) and a change in the virtual orientation 73 of the virtual user 71 can be defined by a change in the polar angle ($\Delta\theta'$) and a change in the azimuthal angle ($\Delta\varphi'$). The mapping M in this example, is such that $\Delta\theta=\Delta\theta'$ & $\Delta\varphi=\Delta\varphi'$.

Each different mapping uses a location reference mapping to map an origin location of the user 51 to an origin virtual location of the virtual user 71. Changes in location 52 of the user 51 are measured relative to the origin location. Changes in virtual location 72 of the virtual user 71 are effected relative to the origin virtual location. The location reference mapping re-locates the constrained virtual space 152 corresponding to the available real space 150 within the virtual space.

Each different mapping uses a change in location mapping (a scale mapping) to map changes in the location 52 of the user 51 to changes in the virtual position 72 of the virtual user 71. The scale mapping re-sizes the constrained virtual space 152 corresponding to the available real space 150 within the virtual space. If a location 52 of the user 51 is defined by a Cartesian co-ordinate (x, y, z) then a virtual location 72 of the virtual user 71 can be defined by corresponding Cartesian coordinates (x', y', z'). A change in the location 52 of the user 51 is defined by a change in one or more of the coordinates ($\Delta$x, $\Delta$y, $\Delta$z) and a change in the virtual position 72 of the virtual user 71 can be defined by a change in one or more of the coordinates ($\Delta$x', $\Delta$y', $\Delta$z'). The mapping M in this example, is such that $\Delta x = k_x \cdot \Delta x'$, $\Delta y = k_y \cdot \Delta y'$, $\Delta z = k_z \cdot \Delta z'$, where $k_x$, $k_y$, $k_z$, are independent, and possibly different, constants defined by the mapping M. In some but not necessarily all examples the mapping M is isomorphic and $k_x = k_y = k_z$. In some but not necessarily all example the scaling is exact (1 to 1) i.e. $k_x = k_y = k_z = 1$.

The illustrated mappings M differ in that they have different orientation reference mappings and/or location reference mappings and/or different scale mappings.

FIG. 6A illustrate a first mapping M that has a first orientation reference mapping, a first location mapping and a first scale mapping.

FIG. 6B illustrate a second mapping M that has a second orientation reference mapping (different to the first orientation reference mapping), a second location mapping (different to the first location mapping) and the first scale mapping. The constrained virtual space 152 has been re-oriented and re-located but not re-sized compared to FIG. 6A. In other examples it could only be re-oriented or only re-located.

FIG. 6B illustrate a third mapping M that has the first orientation reference mapping, a third location mapping (different to the first location mapping and the second location mapping) and a second scale mapping (different to the first scale mapping). The constrained virtual space 152 has been re-located and re-sized compared to FIG. 6A but not re-oriented. In other examples it could only be re-located or only re-sized.

Figure 7:
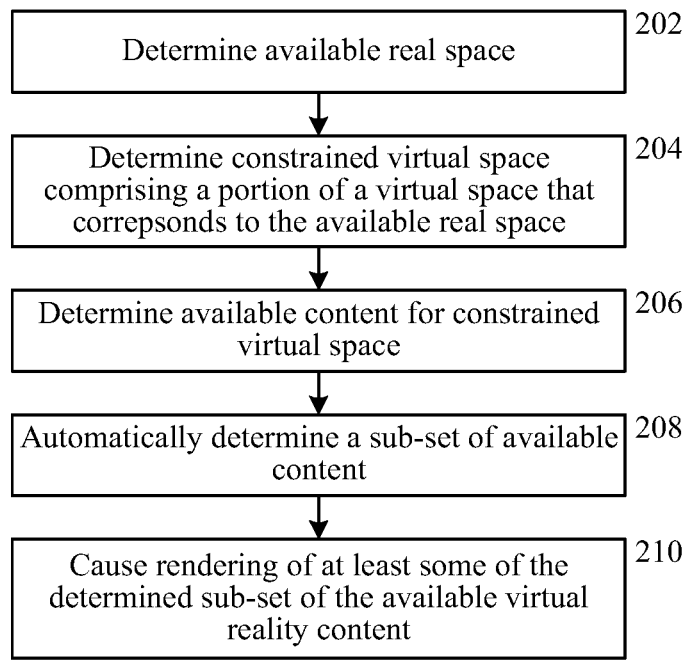
FIG. 7 shows a flowchart of operations according to an example embodiment of the subject matter described herein.

FIG. 7 illustrates an example of a method according to example embodiments.

Example embodiments may comprise means for, at block 202, determining an available real space 150 comprising a portion of a real space 50 that comprises locations 52 available to a user 51 to control a corresponding virtual location 72 of a virtual user 71, via first-person perspective-mediated reality.

As previously explained, first-person perspective-mediated reality creates a correspondence between a location 52 and orientation 53 of a user 51 in real space 50 to a virtual location 72 and virtual orientation 73 of a virtual user 71.

Example embodiments may comprise means for, at block 204, determining a constrained virtual space 152 comprising a portion of a virtual space 20, 60 that corresponds to the available real space 150.

Example embodiments may comprise means for, at block 206, determining available mediated reality content which comprises multiple representations of the virtual space 20, 60 when observed from multiple virtual locations 72 within the constrained virtual space 152.

The multiple representations may be virtual visual scenes, sound scenes or virtual visual scenes and corresponding sound scenes.

An example of available mediated reality content 170 is described later with respect to FIG. 10.

Example embodiments may comprise means for, at block 208, automatically determining a sub-set 174 of the available mediated reality content 170 without requiring the user 51 to change location 52 in the real space 50.

Example embodiments may comprise means for, at block 210, causing rendering of at least some of the determined sub-set 174 of the available virtual reality content to the user 51.

Figure 8:
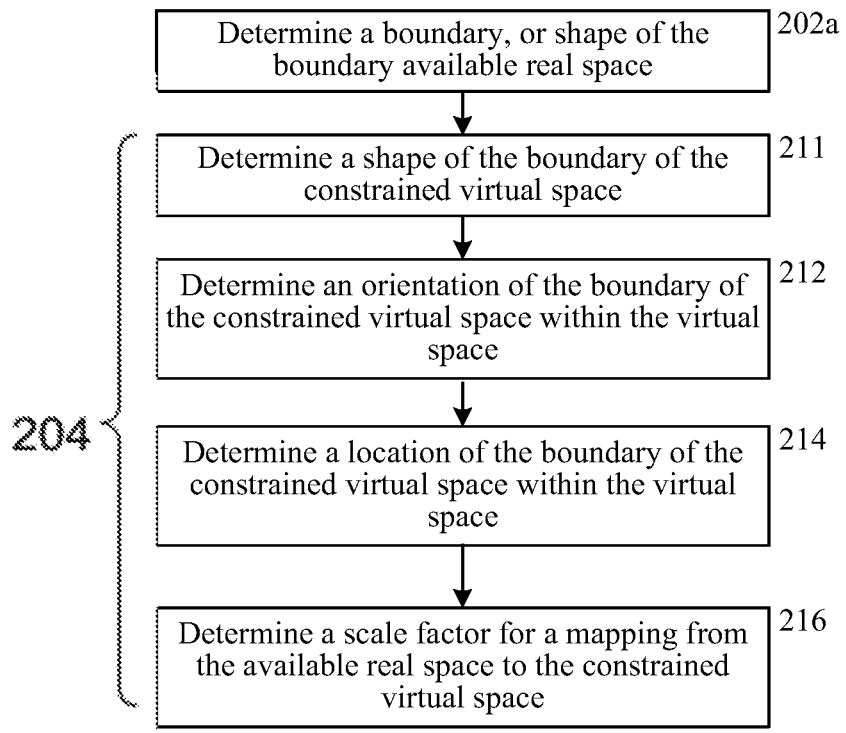
FIG. 8 shows a flowchart of operations according to an example embodiment of the subject matter described herein.

FIG. 8 illustrates, in more detail, an example of blocks 202 and 204 of FIG. 7.

In this example, at block 202a, as an example of block 202, example embodiments determine the available real space 150 by determining a boundary 160 of the available real space. At block 204, example embodiments determine the constrained virtual space 152 by determining a boundary 162 of the constrained virtual space 152 that corresponds to the boundary 160 of the available real space 150.

Determining the boundary 162 of the constrained virtual space 152 comprises, at block 202a, determining a shape of the boundary 160 of the available real space 150 and at block 211 determining a shape of the boundary 162 of the constrained virtual space 152 that corresponds to the shape of the boundary 160 of the available real space 150. The method also comprises at block 212, determining an orientation of the boundary 162 of the constrained virtual space 152 within the virtual space. The method also comprises at block 214, determining a location of the boundary 162 of the constrained virtual space 152 within the virtual space. Example embodiments may also comprise means for, at block 216, determining a scale factor for a mapping from the available real space 150 to the constrained virtual space 152.

The shape of the boundary 160 of the available real space 150 can, for example, be determined by sensing the presence of obstructions using transmitted signals, for example ultrasound signals, or by a user 51 tracing out the boundary 160 via user movement. This may be achieved by using a pointer device that the user points to the boundary 160 at floor level, the location and orientation of the pointing device being converted to the boundary 160 at floor level. This may be alternatively be achieved by using a tracking device that the user carries over the boundary 160 at floor level, the location of the tracking device being converted to a trace of the boundary 160 at floor level.

It will be appreciated from the foregoing description that block 211 may be based upon an isomorphic mapping M from the available real space 150 to the constrained virtual space 152. Thus the shape of the boundary in the real space is also the same shape of the boundary 162 in the virtual space. The block 212 is based upon the orientation reference mapping of the mapping M between the available real space 150 and the constrained virtual space 152. The block 214 is based upon the location mapping of the mapping M between the available real space 150 and the constrained virtual space 152.

The block 216 is based upon the scale mapping of the mapping M between the available real space 150 and the constrained virtual space 152.

The mapping M may be automatically optimized for one or more different criteria. For example, the mapping M may be optimized in dependence upon the available mediated reality content defined by the constrained virtual space 152. The constrained virtual space 152 may, for example, be defined so that the available mediated reality content 170 is content that satisfies one or more criteria such as duration, interactive, rating, etc.

The mapping M can therefore be determined automatically as part of operations performed by example embodiments.

In some examples it may be desirable to enable the user 51 to define or to adjust the mapping M between the available real space 150 and the constrained virtual space 152, so that the user 51 can, in effect, control the constrained virtual space 152 and, as a consequence, the available mediated reality content 170.

Figure 9:
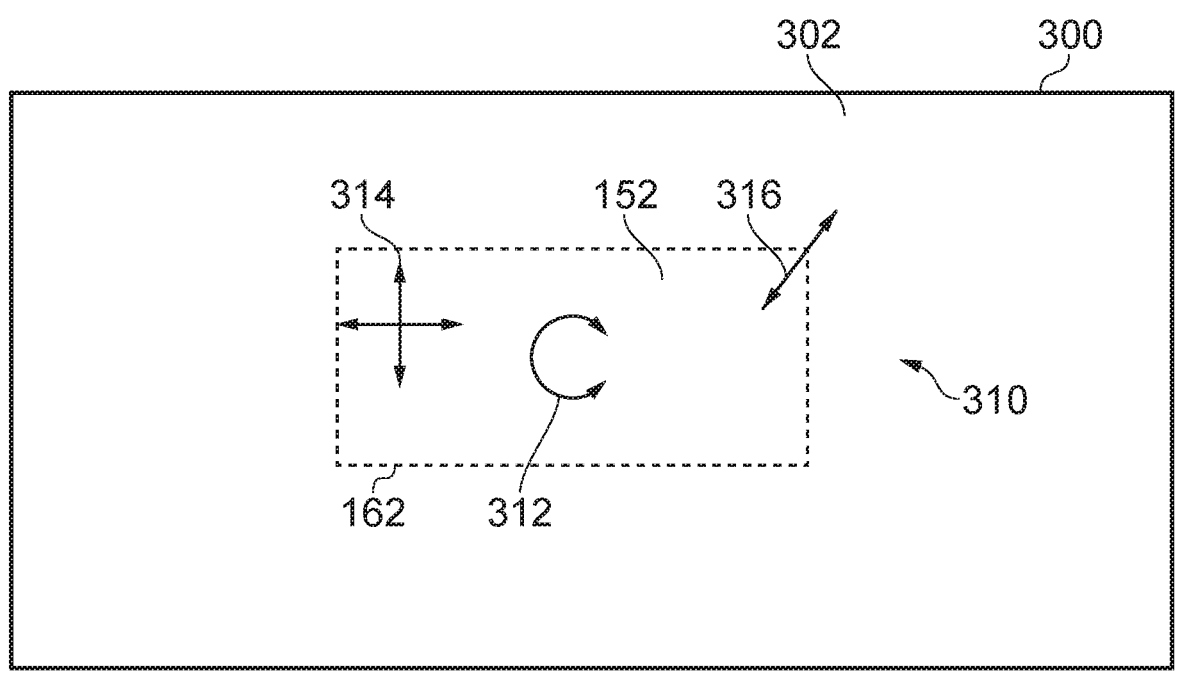
FIG. 9 shows an example user interface according to an example embodiment of the subject matter described herein.

FIG. 9 illustrates an example of a user interface 300 that is configured to enable a user 51 to control, by defining or adjusting, the mapping M between the available real space 150 and the constrained virtual space 152. The user interface 300 comprises a map 302 that illustrates the virtual space. The user interface includes, as an overlay on the map 302, a representation of the constrained virtual space 152. In this example, the boundary 162 of the constrained virtual space 152 is illustrated within the map 302.

The user interface 300 provides user input controls 310.

In this example but not necessarily all examples, the user input controls 310 comprise a user input control 312 for controlling the orientation reference mapping. This enables the user 51 to change an orientation of the constrained virtual space 152 within the map 302 of the virtual space.

In this example but not necessarily all examples, the user input controls 310 comprises a user input control 314 for controlling the location reference mapping. This enables the user 51 to change a location of the constrained virtual space 152 within the map 302 of the virtual space.

In this example but not necessarily all examples, the user input controls 310 comprises a user input control 316 for controlling a scale mapping. This enables the user 51 to resize the constrained virtual space 152 within the map 302 of the virtual space.

The user input controls may be any suitable detector that enables a user 51 to provide a control input such as a touch screen that displays the map 302. A simultaneous two-point contact on the touch screen over the constrained virtual space 152 within the map 302 may be used to re-size the constrained virtual space 152 (e.g. by increasing the separation distance between the two points of simultaneous contact) and/or re-orient the constrained virtual space 152 (e.g. by rotating the two-points of simultaneous contact), and/or re-locate the constrained virtual space 152 (e.g. by sliding movement of the two points of simultaneous contact).

The user interface 300 therefore provides a map 302 to the user 51 that illustrates a boundary 162 of the constrained virtual space 152 within the virtual space and provides one or more options for the user 51 to relocate and/or resize and/or reorient the constrained virtual space 152 within the virtual space. It will be appreciated that the options maintain the isomorphism between the real space and the virtual space. Thus although the values of $k_x$, $k_y$, and $k_z$ may, in some examples, be varied they remain equal to each other.

In some examples, it may be possible for the user 51 to provide a user input that voluntarily changes the available real space 150 and therefore cause a consequential variation in the constrained virtual space 152.

In some, but not necessarily all, examples, the user interface 300 may additionally or alternatively be used to enable a user 51 to control the sub-set 174 of the available mediated reality content 170. For example, if the available mediated reality content 170 comprises representations of the virtual space observable from virtual locations, the user interface 300 may allow the user 51 to determine preferred representations of the virtual space observable from preferred virtual locations. In some examples, the user may be able to define the sub-set 174 of the available mediated reality content 170 by indicating a first set of the preferred locations that are within the constrained virtual space 152 and indicating a second set of the preferred locations that are outside the constrained virtual space 152.

Figure 10:
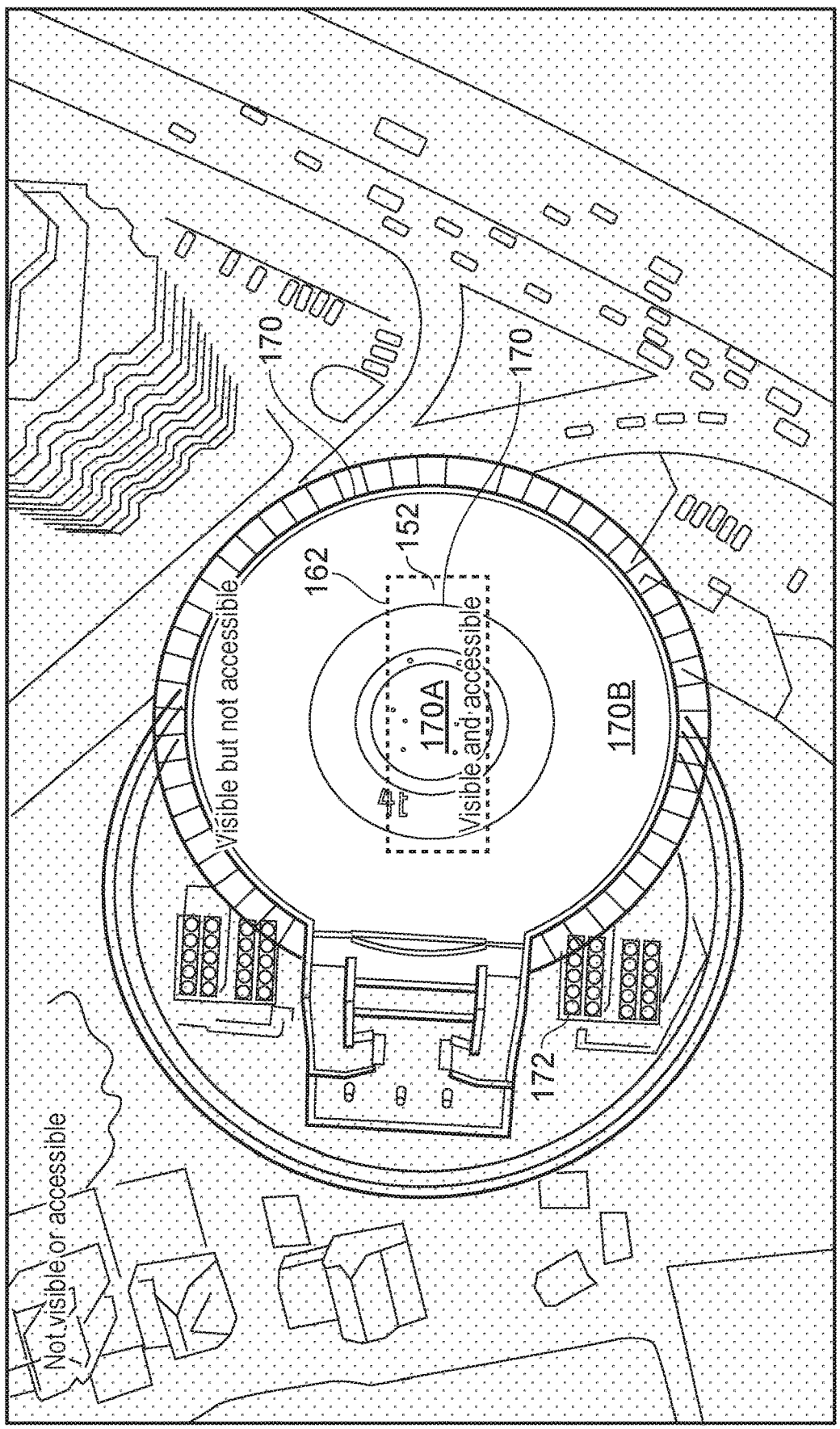
FIG. 10 shows an example view according to an example embodiment of the subject matter described herein.

FIG. 10 illustrates a relationship between the constrained virtual space 152 and its boundary 162 and the available mediated reality content 170.

In some but not necessarily all examples, the available mediated reality content 170 comprises content that can be seen by the user 51 moving, without interacting, within the determined available real space 150. This content is seen by the user 51 moving within the determined available real space 150. In some examples, the available mediated reality content 170 is limited to only content that can be seen by the user 51 moving, without interacting, within the determined available real space 150.

In some but not necessarily all examples, the available mediated reality content 170 comprises content 170A that is both visible to and accessible by the virtual user 71 moving within the constrained virtual space 152. This content can be seen by the user 51 moving within the determined available real space 150. In some examples, the available mediated reality content 170 is limited to only content that is both visible to and accessible 170A by the virtual user 71.

In some but not necessarily all examples, the available mediated reality content 170 comprises what is visible to the virtual user 71 moving within the constrained virtual space 152. This corresponds to the content 170A, 170B that can be seen by the user moving within the determined available real space 150. It includes the content 170A that is visible and accessible and the content 170B that is visible but not accessible. The user 51 (or virtual user 71) cannot interact with content that is not accessible.

In the illustrated example the determined available mediated reality content 170 includes content that is visible content, renderable as a consequence of action by the user 51 within the determined available real space 150 and accessible content, renderable for interaction as a consequence of action by the user 51 within the determined available space 150. The determined available mediated reality content 170 comprises multiple representations of the virtual space when observed from multiple locations within the constrained virtual space 152. The multiple representations of the virtual space 152 may, for example, include virtual visual scenes that are representations of a virtual visual space viewed from a location within the virtual space and/or sound scenes that are representations of a virtual sound space listened to from a position within the virtual space. In some, but not necessarily all, examples, the multiple representations of the virtual space include virtual visual scenes that are video representations of a virtual visual space.

In the illustrated example the determined available mediated reality content 170 does not include content 172 that is not visible or not accessible.

Figure 11:
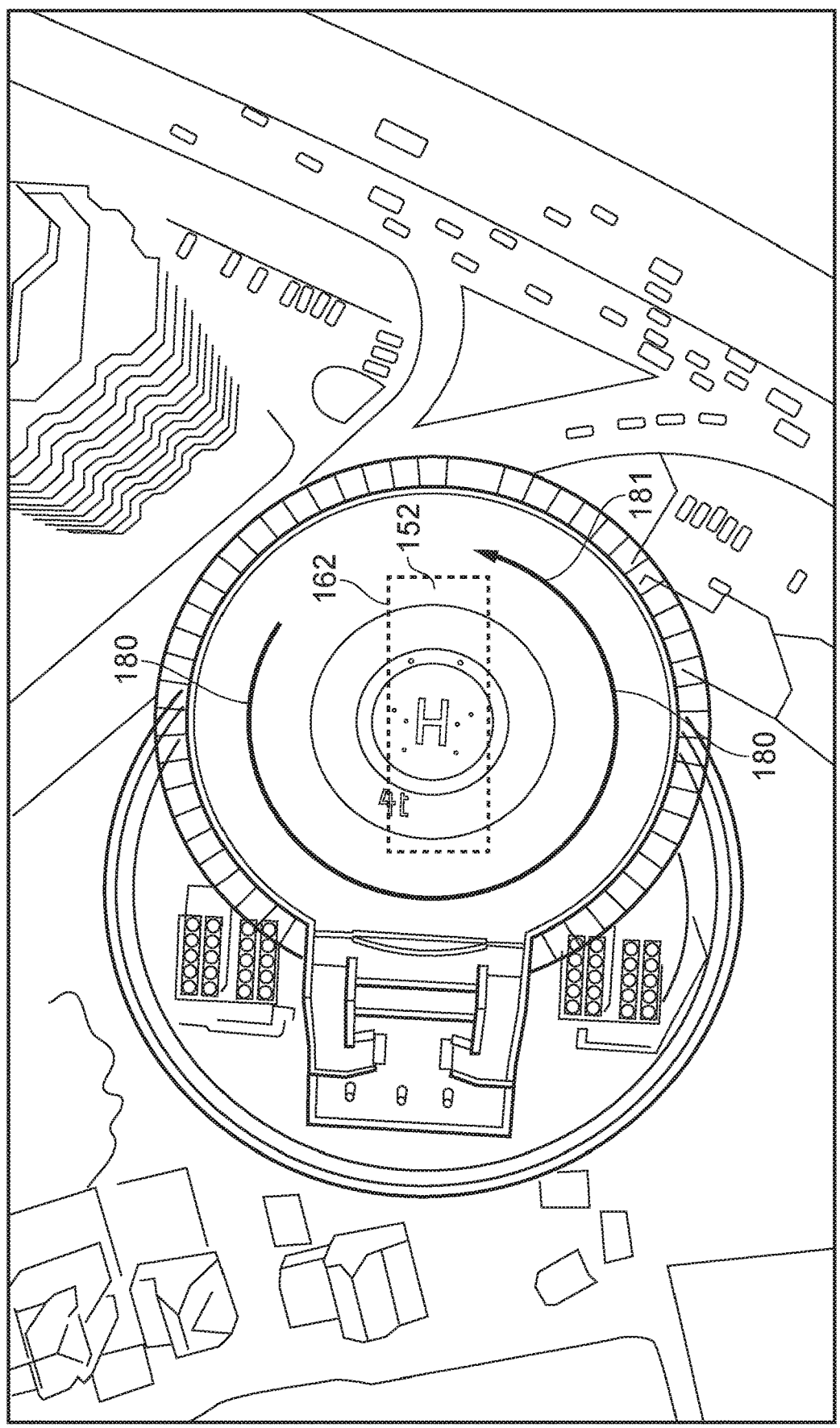
FIG. 11 shows an example view according to an example embodiment of the subject matter described herein.
Figure 12:
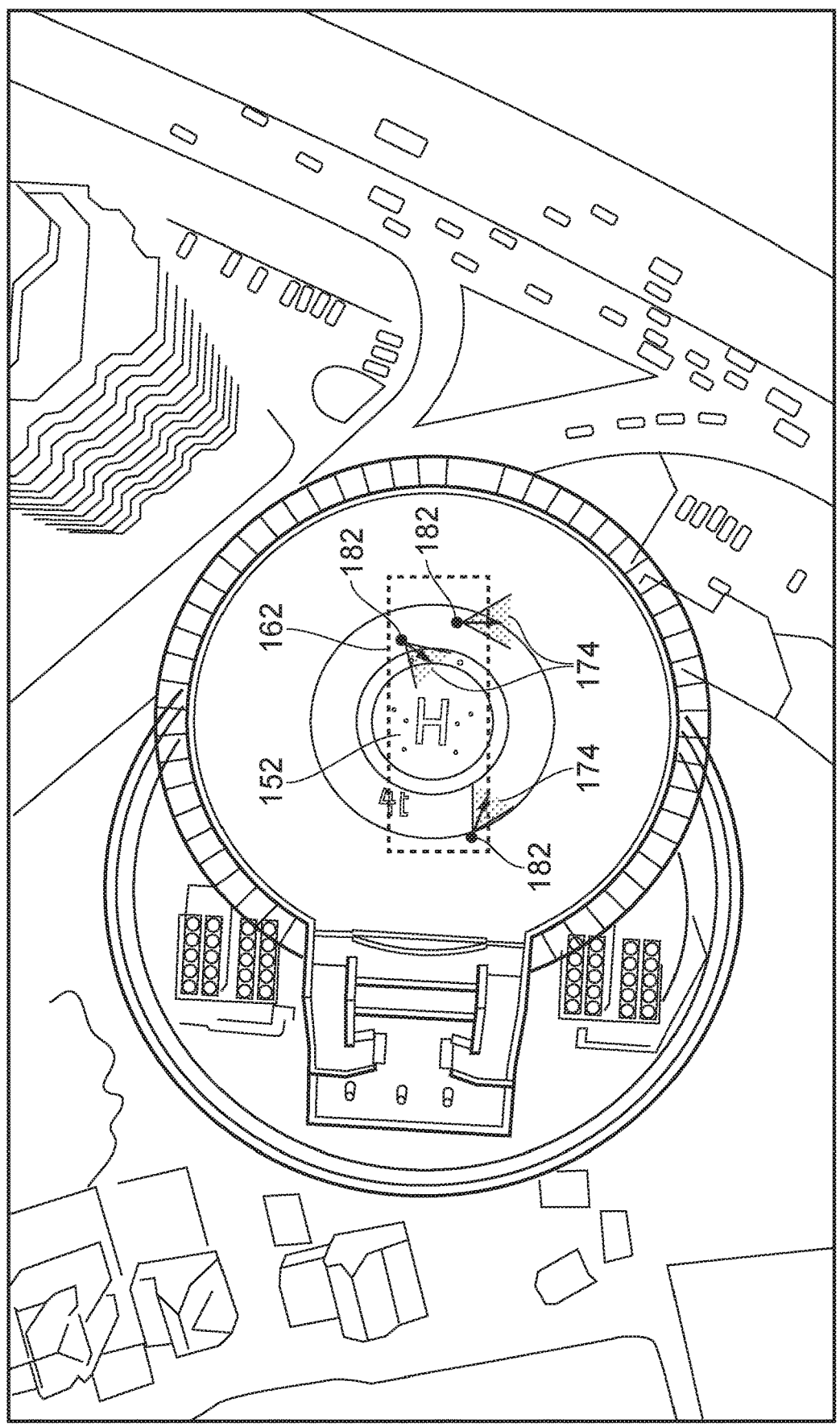
FIG. 12 shows an example view according to an example embodiment of the subject matter described herein.

FIGS. 11 and 12 illustrate an example of the operation of block 208. In this example the method comprises, at block 208, automatically determining a sub-set 174 of the available mediated reality content 170 without requiring the user 51 to change location 52 in the real space 50. In this example, the sub-set 174 of the available mediated reality content 170 is a preview of the available mediated reality content 170. The block 208 therefore automatically creates a preview.

As the available mediated reality content only comprises representations of the virtual space observable from multiple virtual locations within the constrained virtual space 152, the sub-set 174 of the available mediated reality content 170 only comprises representations of the virtual space observable from virtual locations within the constrained virtual space 152. Therefore all the content promised by the preview is viewable by the user 51 by moving only within the available real space 150, after the preview is exited and the previewed content is selected either manually or automatically. The preview contains only those parts of the content that are visible from different locations within the available real space 150. In some example, the preview may be generated from the content by analysis of the content and in other examples the preview may be generated by editing an existing preview of the content to remove unviewable content by analysis of the existing preview.

In the example illustrated in FIG. 11, the preview is a panning preview 180. Example embodiments generate content for a panning preview 180, and cause rendering of the panning preview 180 without requiring the user 51 to change location 52 in the real space 50. The sub-set 174 of the available mediated reality content 170, that controls the panning preview, comprises multiple representations of the virtual space that are observable from some or all orientations 73 along a trail 181 of virtual locations 72.

In some examples, the trail 181 is wholly within the constrained virtual space 152. In other examples, the trail 181 is partially or wholly outside the constrained virtual space 152. Where the trail 181 is outside the constrained virtual space 152, the sub-set 174 of the available mediated reality content 170, that control the panning preview, comprises multiple representations of the virtual space that are observable from orientations 73, along the trail 181 of virtual locations 72, that are directed towards the constrained virtual space 152.

In the example illustrated in FIG. 11, the panning preview 180 is created as a fly-through trail 181. In this fly-through trail, the virtual location 72 of the virtual user 71 that determines a rendered representation of the virtual space, moves automatically along the trail 181. In some examples during rendering of the panning preview as a fly-through trail 181, changes in the virtual orientation 73 of the virtual user 71 that determine the rendered representation of the virtual space (e.g. virtual visual scene) correspond to changes in the orientation 53 of the user 51 as the virtual user 71 moves automatically along the trail 181. In other examples of a fly-through trail 181, the virtual orientation 73 of the virtual user 71 changes automatically as the virtual user 71 moves automatically along the trail 181 and is not dependent upon changes in the orientation 53 of the user 51.

FIG. 12 illustrates a different example, in which the sub-set 174 of the available mediated reality content 170, that controls the preview, comprises multiple representations of the virtual space when observed from specific discrete virtual locations 182 within the constrained virtual space 152. In this example the specific discrete virtual locations are a set of preferred locations 182 within the constrained virtual space 152.

In some but not necessarily all examples, the sub-set 174 of the available mediated reality content 170, that controls the preview, comprises multiple representations of the virtual space when observed from specific discrete virtual locations 182 within the constrained virtual space 152 at specific orientations.

In the example illustrated in FIG. 12, in the preview, the virtual location 72 of the virtual user 71 that determines a rendered representation of the virtual space, moves automatically from location 182 to location 182. In some examples during rendering of the preview, changes in the virtual orientation 73 of the virtual user 71 that determine the rendered representation of the virtual space (e.g. virtual visual scene) correspond to changes in the orientation 53 of the user 51 as the virtual user 71 moves automatically from location 182 to location 182. In other examples, the virtual orientation 73 of the virtual user 71 changes automatically as the virtual user 71 moves automatically from location 182 to location 182 and is not dependent upon changes in the orientation 53 of the user 51.

Figure 13:
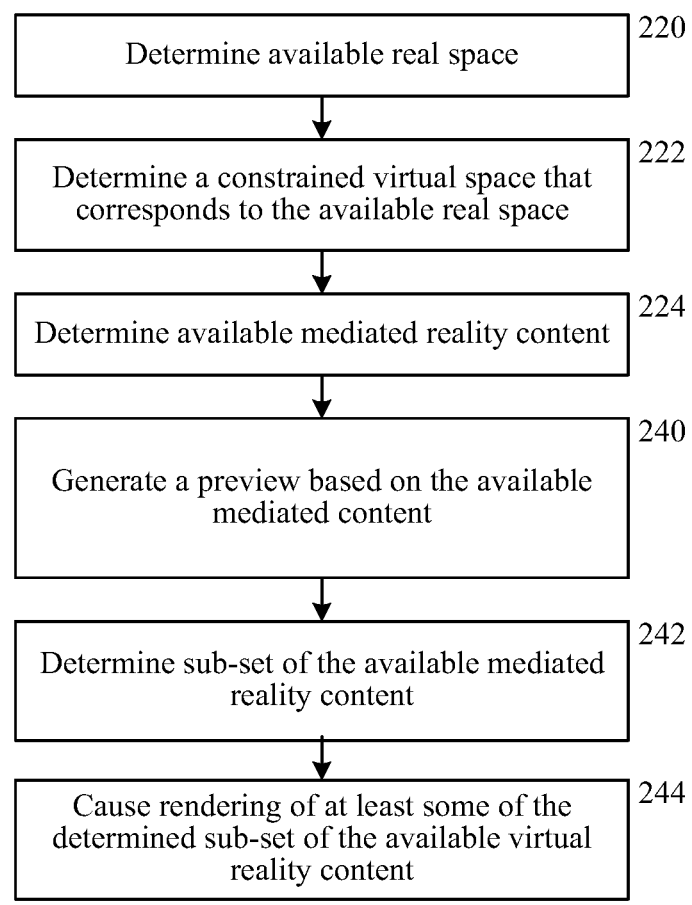
FIG. 13 shows a flowchart of operations according to an example embodiment of the subject matter described herein.
Figure 14:
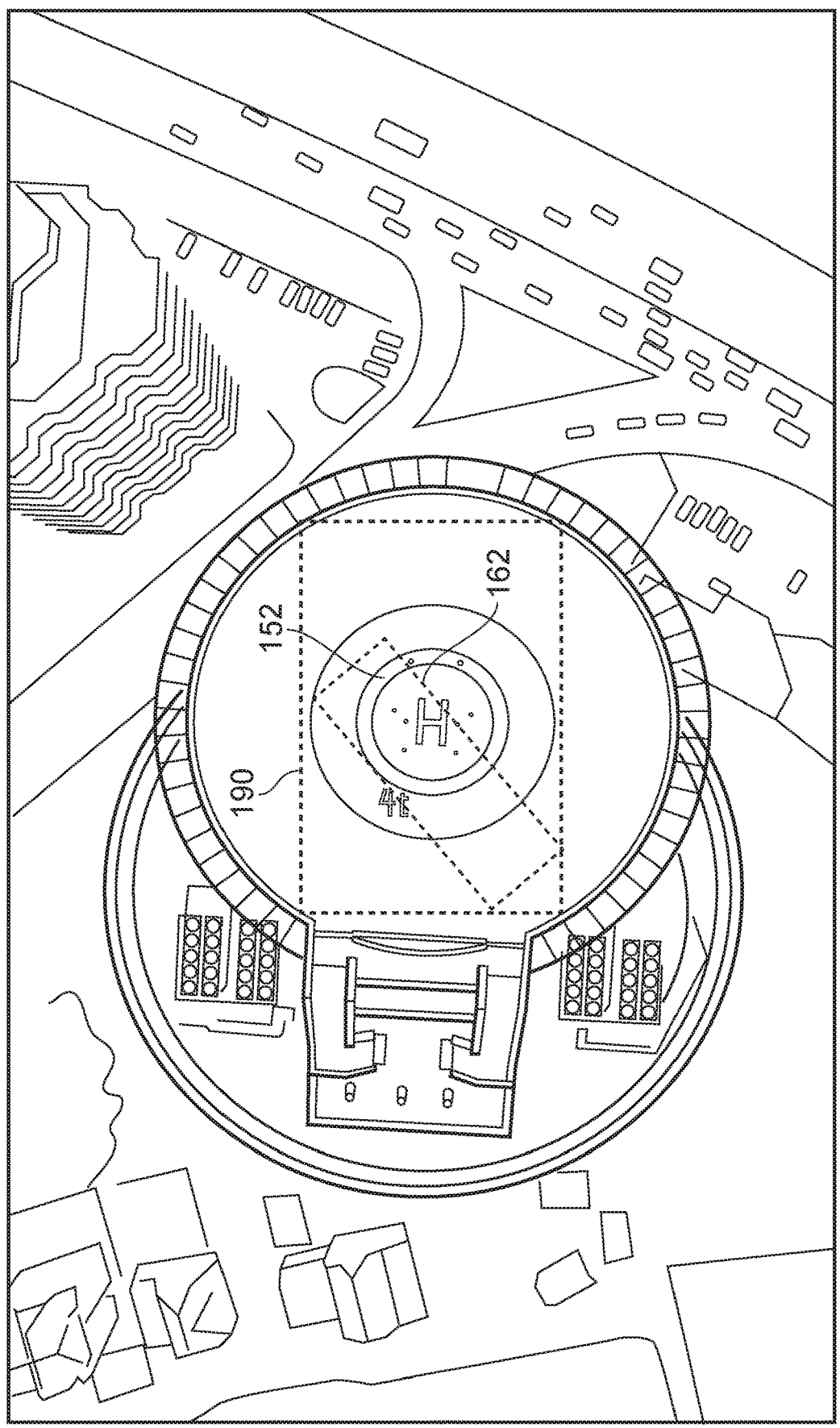
FIG. 14 shows an example view according to an example embodiment of the subject matter described herein.

The examples illustrated in FIGS. 13 to 15 describe examples in which the sub-set 174 of the available mediated reality content 170 is automatically determined during rendering of a preview. In these examples, the sub-set 174 of available mediated reality content 170 comprises a sub-set of the multiple representations of the virtual space when observed from a sub-set of virtual locations within the constrained virtual space 152. The sub-set of virtual locations 182 are selected by the user during rendering of a preview. The selected virtual locations 182 and the available real space 150 determines the constrained virtual space 152.

FIG. 13 illustrates example operations according to example embodiments, in which a preview is used to determine the sub-set of the available mediated reality content 170.

Example embodiments may comprise means for, at block 220, for determining the available real space 150. Next, at block 222, example embodiments determine a constrained virtual space 152 that corresponds to the available real space 150. At block 224, example embodiments may comprise means for determining available mediated reality content 170. The available mediated reality content 170 comprises multiple representations of the virtual space when observed from multiple virtual locations within the constrained virtual space 152. The representations can include virtual visual scenes and/or sound scenes.

Next, at example embodiments may automatically determines a sub-set 174 of the available mediated reality content 170 without requiring the user 51 to change location 52 in the real space 50 by performing operations 240 and/or 242. at block 240, generation of a preview based on the available mediated reality content 170. This preview is rendered to the user 51. The sub-set 174 of the available mediated reality content 170 is determined, at block 242, during rendering of the preview. The determination is based upon which portions of the available mediated reality content 170 attract the user's attention. This can for example be determined by monitoring where and for how long a user looks at particular available mediated reality content 170. The content that is most popular based on this monitoring, is then included in the sub-set 174 of the available mediated reality content 170. Finally, at block 244, example embodiments cause rendering of at least some of the determined sub-set 174 of the available virtual reality content to the user 51. This can for example be achieved by redetermining the constrained virtual space 152 that corresponds to the available real space 150 such that the new available mediated reality content observable from the virtual locations within the new constrained virtual space 152 are determined by the sub-set 174 of the available mediated reality content, as shown by operation 228. This corresponds to a re-location of the constrained virtual space 152. The constrained virtual space 152 may, in addition, be reoriented and/or resized.

Figure 15A:
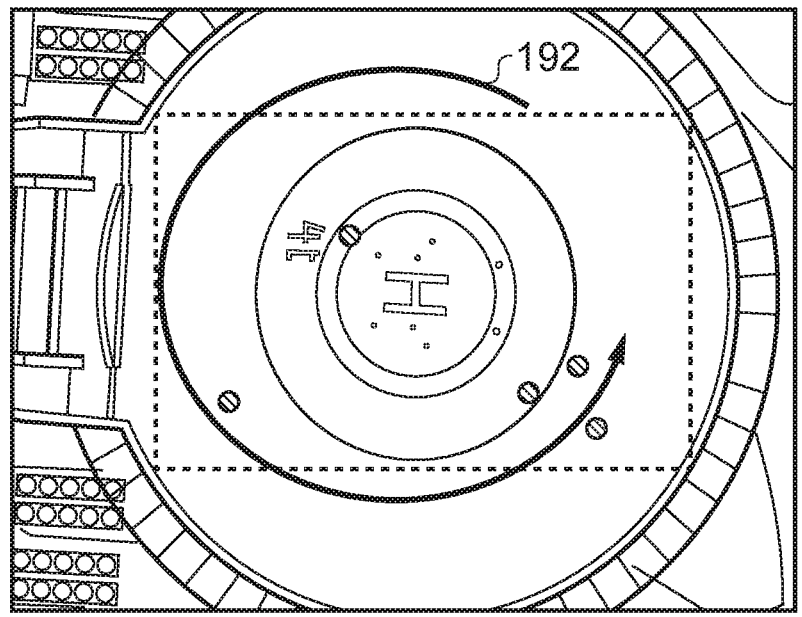
FIGS. 15A, 15B and 15C show example views according to an example embodiment of the subject matter described herein.
Figure 15B:
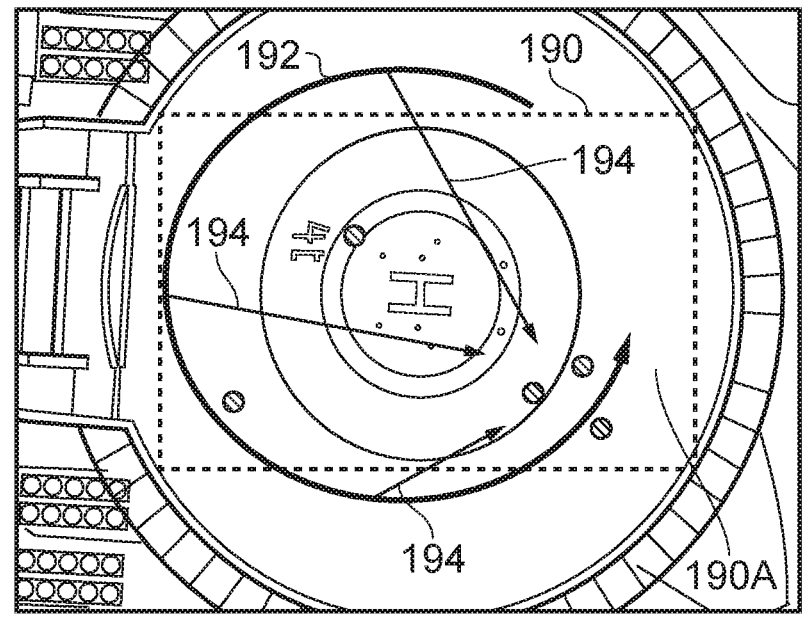
Figure 15C:
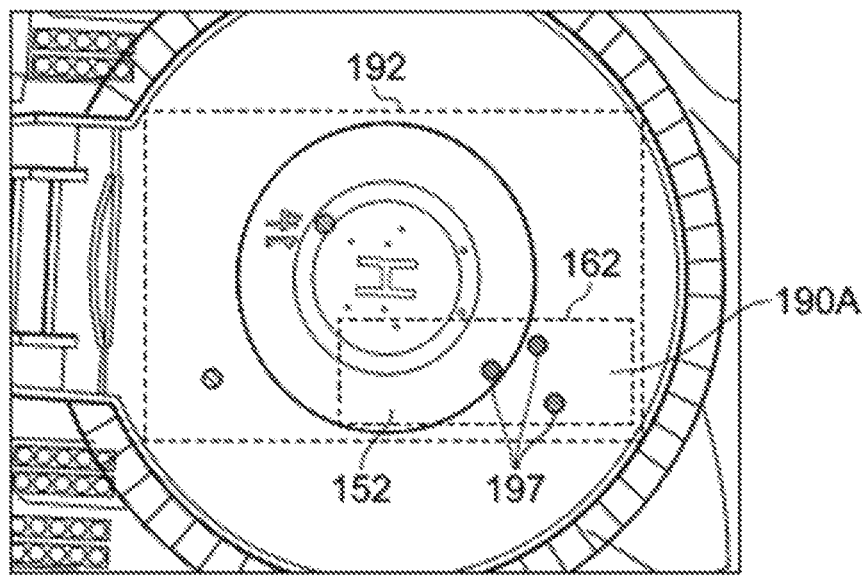

The operation of the method of FIG. 13 may be further understood by reference to FIGS. 14 and 15A, 15B and 15C. FIG. 14 illustrates an initial placement of a constrained virtual space 152, having a boundary 162, relative to particular content 190 in the virtual space. FIG. 15A illustrates a trajectory 192 of a fly-through that may be used to generate a preview of the content 190. FIG. 15B illustrates a direction 194 in which the user looks, relative to the trajectory 192, during the preview. It can be seen that the directions 194 point towards a particular portion 190A of the content 190. In this example, the user looks towards particular interactive objects 197. FIG. 15C illustrates a reorientation and/or relocation and/or re-sizing of the constrained virtual space 152 as a consequence of the user's attention towards the portion 190A of the content 190. In the example illustrated, there is a reorientation and relocation of the constrained virtual space 152 as a consequence of the user's attention towards the portion 190A. It can be seen that the constrained virtual space 152 has been positioned and oriented such that it overlaps with the portion of the virtual space that corresponds to the portion of the content 190A.

Consequently, the sub-set 174 of available mediated reality content 190 corresponds to the portion 190A and comprises a sub-set of the multiple representations of the virtual space when observed from a sub-set of virtual locations within the constrained virtual space 152, wherein the sub-set of virtual locations are selected by the user during rendering of the preview. In this example the selecting of the sub-set of virtual locations is based upon a gaze direction (the direction in which the user 51 is looking) and gaze duration (time period during which user 51 is looking in a particular direction) during the preview.

Figure 16:
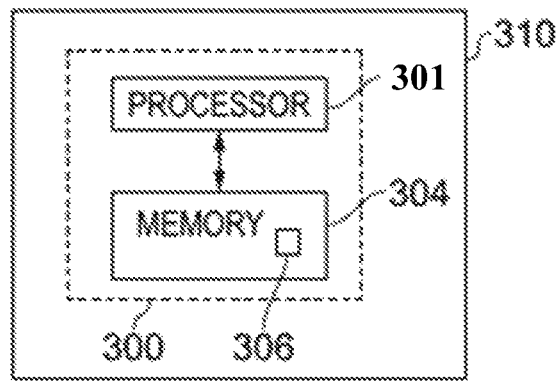
FIG. 16 shows an example schematic diagram according to an example embodiment of the subject matter described herein.

FIG. 16 illustrates an example of a controller 300. Implementation of a controller 300 may be as controller circuitry. The controller 300 may be implemented in hardware alone, have certain aspects in software including firmware alone or can be a combination of hardware and software (including firmware).

As illustrated in FIG. 16 the controller 300 may be implemented using instructions that enable hardware functionality, for example, by using executable instructions of a computer program 306 in a general-purpose or special-purpose processor 301 that may be stored on a computer readable storage medium (disk, memory etc) to be executed by such a processor 301.

The processor 301 is configured to read from and write to the memory 304. The processor 301 may also comprise an output interface via which data and/or commands are output by the processor 301 and an input interface via which data and/or commands are input to the processor 301.

The memory 304 stores a computer program 306 comprising computer program instructions (computer program code) that controls the operation of the apparatus 310 when loaded into the processor 301. The computer program instructions, of the computer program 306, provide the logic and routines that enables the apparatus to perform the methods illustrated in FIGS. 7, 8 and 13. The processor 301 by reading the memory 304 is able to load and execute the computer program 306.

The apparatus 310 therefore comprises:
at least one processor 301; and
at least one memory 304 including computer program code
the at least one memory 304 and the computer program code configured to, with the at least one processor 301, cause the apparatus 310 at least to perform:
determining an available real space comprising a portion of a real space that comprises locations available to a user to control a corresponding virtual location of a virtual user, via first-person perspective-mediated reality, wherein first-person perspective-mediated reality creates a correspondence between a location and orientation of a user in real space to a virtual location and virtual orientation of a virtual user;
determining a constrained virtual space comprising a portion of a virtual space that corresponds to the available real space;
determining available mediated reality content which comprises multiple representations of the virtual space when observed from multiple virtual locations within the constrained virtual space;
automatically determining a sub-set of the available mediated reality content without requiring the user to change location in the real space; and
causing rendering of at least some of the determined sub-set of the available virtual reality content to the user.

This operation may be configured to occur in response to switching to first-person perspective-mediated reality from third person perspective-mediated reality. That is it is a calibration step in setting up first-person perspective-mediated reality.

Figure 17:
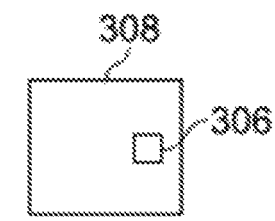
FIG. 17 shows an example schematic diagram according to an example embodiment of the subject matter described herein.

As illustrated in FIG. 17, the computer program 306 may arrive at the apparatus 310 via any suitable delivery mechanism 308. The delivery mechanism 308 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 306. The delivery mechanism may be a signal configured to reliably transfer the computer program 306. The apparatus 310 may propagate or transmit the computer program 306 as a computer data signal.

Computer program instructions for causing an apparatus to perform at least the following or for performing at least the following:
determining an available real space comprising a portion of a real space that comprises locations available to a user to control a corresponding virtual location of a virtual user, via first-person perspective-mediated reality, wherein first-person perspective-mediated reality creates a correspondence between a location and orientation of a user in real space to a virtual location and virtual orientation of a virtual user;
determining a constrained virtual space comprising a portion of a virtual space that corresponds to the available real space;
determining available mediated reality content which comprises multiple representations of the virtual space when observed from multiple virtual locations within the constrained virtual space;
automatically determining a sub-set of the available mediated reality content without requiring the user to change location in the real space; and
causing rendering of at least some of the determined sub-set of the available virtual reality content to the user.

The computer program instructions may be comprised in a computer program, a non-transitory computer readable medium, a computer program product, a machine readable medium. In some but not necessarily all examples, the computer program instructions may be distributed over more than one computer program.

Although the memory 304 is illustrated as a single component/circuitry it may be implemented as one or more separate components/circuitry some or all of which may be integrated/removable and/or may provide permanent/semi-permanent/dynamic/cached storage.

Although the processor 301 is illustrated as a single component/circuitry it may be implemented as one or more separate components/circuitry some or all of which may be integrated/removable. The processor 301 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:
(a) hardware-only circuitry implementations (such as implementations in only analog and/or digital circuitry) and
(b) combinations of hardware circuits and software, such as (as applicable):
(i) a combination of analog and/or digital hardware circuit(s) with software/firmware and
(ii) any portions of hardware processor(s) with software (including digital signal processor(s)), software, and memory(ies) that work together to cause an apparatus, such as a mobile phone or server, to perform various functions and
(c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The blocks illustrated in the FIGS. 7, 8 and 13 may represent steps in a method and/or sections of code in the computer program 306. The illustration of a particular order to the blocks does not necessarily imply that there is a required or preferred order for the blocks and the order and arrangement of the block may be varied. Furthermore, it may be possible for some blocks to be omitted.

Figure 18:
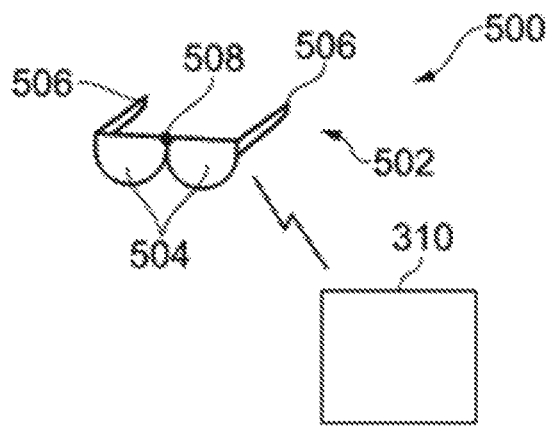
FIG. 18 shows an example apparatus according to an example embodiment of the subject matter described herein.

FIG. 18 illustrates an example of a system 500 comprising the apparatus 310 and a head mounted display apparatus 502.

The head mounted display apparatus 502 comprises a display 504 that is not a see-through display. The display is configured to display virtual reality content, for example, a virtual visual scene. The head mounted display apparatus 502 can, in some examples, comprise audio output device(s) 506. The audio output device(s) 506 is/are configured to render virtual reality content, for example, a sound scene.

The head mounted display apparatus 502 is configured to enable tracking of an orientation 53 of a user 51 wearing the head mounted display apparatus 502. In this example, the head mounted display apparatus 502 comprises positioning circuitry 508 that enables tracking of a location 52 and enables tracking of a head orientation 53 of the user 51 wearing the head mounted apparatus 502.

The apparatus 502 is, for example as previously described. In some examples, it comprises means for:
determining an available real space comprising a portion of a real space that comprises locations available to a user to control a corresponding virtual location of a virtual user, via first-person perspective-mediated reality, wherein first-person perspective-mediated reality creates a correspondence between a location and orientation of a user in real space to a virtual location and virtual orientation of a virtual user;
determining a constrained virtual space comprising a portion of a virtual space that corresponds to the available real space;
determining available mediated reality content which comprises multiple representations of the virtual space when observed from multiple virtual locations within the constrained virtual space;
automatically determining a sub-set of the available mediated reality content without requiring the user to change location in the real space; and
causing rendering, using the display 504 of the head mounted display apparatus 502, of at least some of the determined sub-set of the available virtual reality content to the user.

Where a structural feature has been described, it may be replaced by means for performing one or more of the functions of the structural feature whether that function or those functions are explicitly or implicitly described.

As used here 'module' refers to a unit or apparatus that excludes certain parts/components that would be added by an end manufacturer or a user. The controller 300 may be a module, for example.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one." or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although embodiments have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain embodiments, those features may also be present in other embodiments whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer and exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

The invention claimed is:

1. An apparatus comprising:
   at least one processor; and
   at least one memory including computer program code,
   the at least one memory and the computer program code configured to, with the at least one processor, cause the apparatus to perform at least the following:
   determine an available real space comprising a portion of a real space that comprises locations available to a user to control a corresponding virtual location of a virtual user, via first-person perspective-mediated reality, wherein first-person perspective-mediated reality creates a correspondence between a location and orientation of a user in real space to a virtual location and virtual orientation of a virtual user;
   determine a constrained virtual space comprising a portion of a virtual space that corresponds to the available real space and excludes another portion of the virtual space that is not accessible to the virtual user moving within the available real space;
   determine available mediated reality content which comprises multiple representations of the virtual space when observed from multiple virtual locations within the constrained virtual space and excludes representations of the virtual space from perspectives outside the constrained virtual space;
   determine a sub-set of the available mediated reality content without requiring the user to change location in the real space; and
   render at least one of the determined sub-set of the available virtual reality content to the user.

2. An apparatus as claimed in claim 1, further caused to determine a boundary of the available real space and determine a boundary of the constrained virtual space that corresponds to the available real space.

3. An apparatus as claimed in claim 1, further caused to determine a shape of a boundary of the available real space;
   determine a shape of a boundary of the constrained virtual space that corresponds to the available real space; and
   determine a location of the boundary of the constrained virtual space within the virtual space.

4. An apparatus as claimed in claim 2, further caused to determine the location of the boundary of the constrained virtual space within the virtual space and/or the scale factor for a mapping from the available real space to the constrained virtual space.

5. An apparatus as claimed in claim I, further caused to provide a map to the user that illustrates a boundary of the constrained virtual space within the virtual space and provides an option for the user to re-locate the constrained virtual space within the virtual space and/or change a scale, but not a shape, of the constrained virtual space within the virtual space.

6. An apparatus as claimed in claim 1, wherein the determined sub-set of available mediated reality content is limited to what can be seen by the user moving, without interacting, within the determined available real space or the determined sub-set of available mediated reality content is limited to what can be seen by the user moving, with interacting, within the determined available real space.

7. An apparatus as claimed in claim 1, wherein the multiple representations of the virtual space include virtual visual scenes that are representations of a virtual visual space viewed from a location within the virtual space and/or sound scenes that are representations of a virtual sound space listened to from a position within the virtual space.

8. An apparatus as claimed in claim 1,
   wherein determining a sub-set of the available mediated reality content without requiring the user to change location in the real space, generates a content for a panning preview and wherein causing rendering of at least one of the determined sub-set of the available virtual reality content to the user, causes rendering of the panning preview without requiring the user to change location in the real space.

9. An apparatus as claimed in claim 1,
   wherein the sub-set of available mediated reality content comprises a sub-set of the multiple representations of the virtual space when observed from a sub-set of virtual locations within the constrained virtual space, wherein the sub-set of virtual locations are selected by the user during rendering of a preview.

10. An apparatus as claimed in claim 1, further caused to select the sub-set of virtual locations based on a gaze direction and gaze duration during a preview.

11. A method comprising:
    determining an available real space comprising a portion of a real space that comprises locations available to a user to control a corresponding virtual location of a virtual user, via first-person perspective-mediated reality, wherein first-person perspective-mediated reality creates a correspondence between a location and orientation of a user in real space to a virtual location and virtual orientation of a virtual user;
determining a constrained virtual space comprising a portion of a virtual space that corresponds to the available real space and excludes another portion of the virtual space that is not accessible to the virtual user moving within the available real space;
determining available mediated reality content which comprises multiple representations of the virtual space when observed from multiple virtual locations within the constrained virtual space and excludes representations of the virtual space from perspectives outside the constrained virtual space;
determining a sub-set of the available mediated reality content without requiring the user to change location in the real space; and
causing rendering of at least one of the determined sub-set of the available virtual reality content to the user.

12. A method as claimed in claim 11, wherein the method as claimed in claim 11, occurs in response to switching to first-person perspective-mediated reality from third person perspective-mediated reality.

13. A method as claimed in claim 11, comprising determining a boundary of the available real space and determining a boundary of the constrained virtual space that corresponds to the available real space.

14. A method as claimed in claim 11, comprise determining a shape of a boundary of the available real space;
determining a shape of a boundary of the constrained virtual space that corresponds to the available real space; and
determining a location of the boundary of the constrained virtual space within the virtual space.

15. A method as claimed in claim 13, comprising determining the location of the boundary of the constrained virtual space within the virtual space and/or the scale factor for a mapping from the available real space to the constrained virtual space.

16. A method as claimed in claim 11, comprising providing a map to the user that illustrates a boundary of the constrained virtual space within the virtual space and provides an option for the user to re-locate the constrained virtual space within the virtual space and/or change a scale, but not a shape, of the constrained virtual space within the virtual space.

17. A method as claimed in claim 11, wherein the determined sub-set of available mediated reality content is limited to what can be seen by the user moving, without interacting, within the determined available real space or the determined sub-set of available mediated reality content is limited to what can be seen by the user moving, with interacting, within the determined available real space.

18. A method as claimed in claim 11, wherein the multiple representations of the virtual space include virtual visual scenes that are representations of a virtual visual space viewed from a location within the virtual space and/or
sound scenes that are representations of a virtual sound space listened to from a position within the virtual space.

19. A method as claimed in claim 11,
wherein determining a sub-set of the available mediated reality content without requiring the user to change location in the real space, generates a content for a panning preview and wherein causing rendering of at least one of the determined sub-set of the available virtual reality content to the user, causes rendering of the panning preview without requiring the user to change location in the real space.

20. A non-transitory computer readable medium comprising program instructions stored thereon for performing at least the following:
determining an available real space comprising a portion of a real space that comprises locations available to a user to control a corresponding virtual location of a virtual user, via first-person perspective-mediated reality, wherein first-person perspective-mediated reality creates a correspondence between a location and orientation of a user in real space to a virtual location and virtual orientation of a virtual user;
determining a constrained virtual space comprising a portion of a virtual space that corresponds to the available real space and excludes another portion of the virtual space that is not accessible to the virtual user moving within the available real space;
determining available mediated reality content which comprises multiple representations of the virtual space when observed from multiple virtual locations within the constrained virtual space and excludes another portion of the virtual space that is not accessible to the virtual user moving within the constrained virtual space;
determining a sub-set of the available mediated reality content without requiring the user to change location in the real space; and
causing rendering of at least one of the determined sub-set of the available virtual reality content to the user.

* * * * *